(12) United States Patent
Kim et al.

(10) Patent No.: US 6,763,713 B2
(45) Date of Patent: Jul. 20, 2004

(54) MALFUNCTION DETECTING METHOD FOR A VEHICLE FUEL LEVEL SENSOR

(75) Inventors: Youn-Soo Kim, Gyeonggi-do (KR); Je-Young Seo, Gyeonggi-do (KR)

(73) Assignee: Hyundai Motor Company, Seocho-ku (KR)

( * ) Notice: Subject to any disclaimer, the term of this patent is extended or adjusted under 35 U.S.C. 154(b) by 18 days.

(21) Appl. No.: 10/331,886

(22) Filed: Dec. 30, 2002

(65) Prior Publication Data

US 2003/0221479 A1 Dec. 4, 2003

(30) Foreign Application Priority Data

May 29, 2002 (KR) .......................................... 2002-29899
Jun. 28, 2002 (KR) ................................ 10-2002-0036965

(51) Int. Cl.⁷ ......................... G01F 23/00; G01M 19/00; G06F 19/00
(52) U.S. Cl. ......................... 73/291; 73/113; 73/290 R; 73/118.1; 702/55
(58) Field of Search .............................. 73/291, 290 R, 73/113, 118.1, 55

(56) References Cited

U.S. PATENT DOCUMENTS

| | | | |
|---|---|---|---|
| 4,782,690 A | | 11/1988 | Terasaka |
| 5,495,745 A | | 3/1996 | Hughes |
| 5,752,490 A | | 5/1998 | Rodgers et al. |
| 5,983,714 A | | 11/1999 | Izumiura et al. |
| 6,092,021 A | * | 7/2000 | Ehlbeck et al. ............. 701/123 |
| 6,250,292 B1 | | 6/2001 | Suhre |
| 6,276,193 B1 | | 8/2001 | Benjey |
| 6,298,840 B1 | | 10/2001 | Kerns |
| 6,357,288 B1 | * | 3/2002 | Shigihama et al. ......... 73/118.1 |
| 6,397,668 B1 | * | 6/2002 | Davison et al. ............... 73/113 |
| 6,601,573 B1 | * | 8/2003 | Frank ......................... 123/683 |
| 6,604,407 B2 | * | 8/2003 | Kano et al. .................. 73/49.7 |
| 6,668,645 B1 | * | 12/2003 | Gilmour et al. .......... 73/290 R |

* cited by examiner

Primary Examiner—Michael Cygan
(74) Attorney, Agent, or Firm—Morgan Lewis & Bockius LLP

(57) ABSTRACT

The present invention provides a fuel level sensor malfunction detecting method and system for a vehicle. In the method and system the rate of change in the opening of the throttle valve and the detection of a transmission kick-down are conditions for determining the malfunction of the fuel level sensor, thereby making it possible to detect a malfunctioning fuel level sensor more accurately.

14 Claims, 3 Drawing Sheets

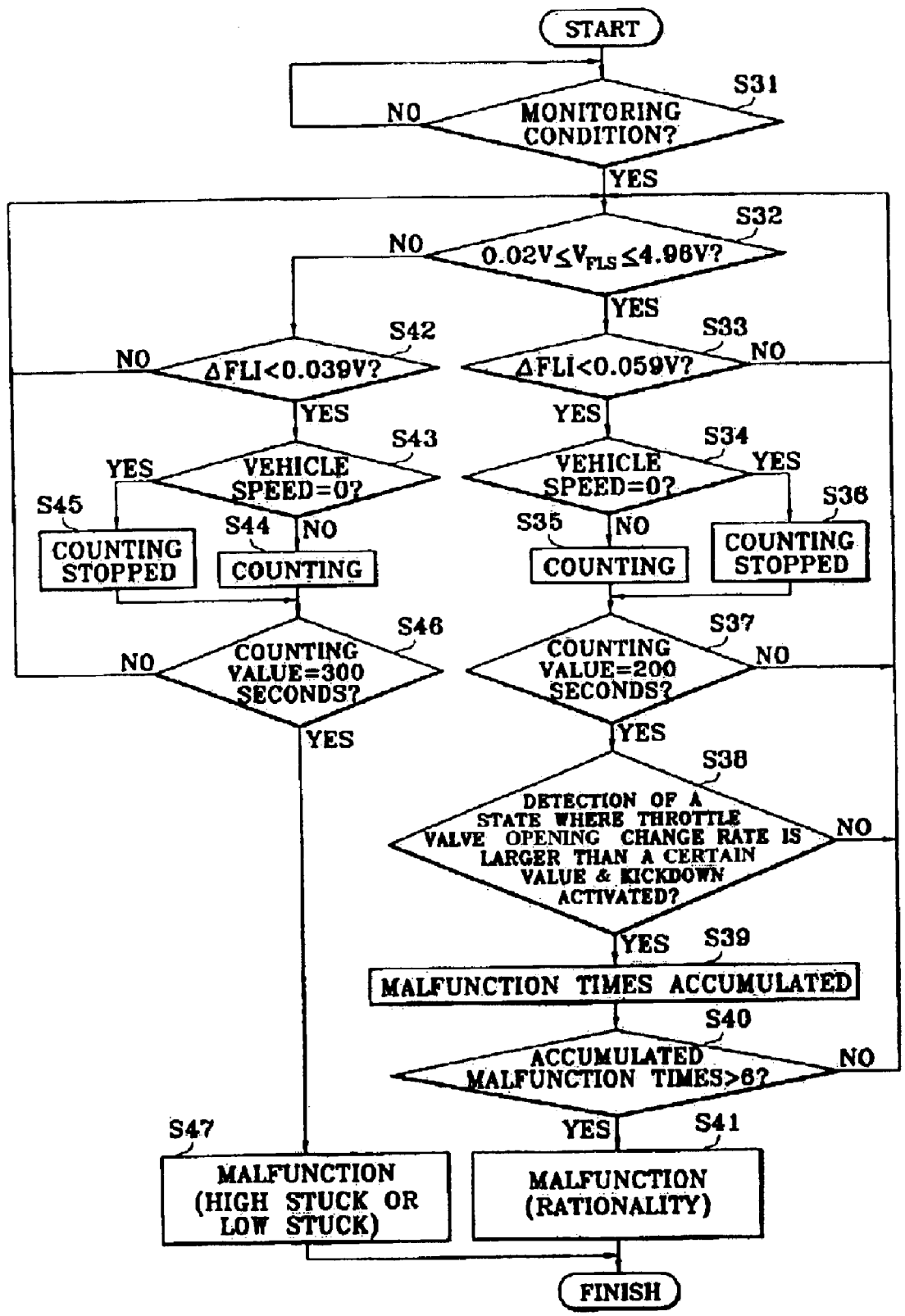

MALFUNCTION DETECTING METHOD FOR A VEHICLE FUEL LEVEL SENSOR

FIELD OF THE INVENTION

The present invention relates to a method and system for detecting the malfunction of a vehicle fuel level sensor. More particularly, the invention relates to a method and system that detects malfunctions more accurately by utilizing variation in the fuel level due to vehicle acceleration or deceleration.

BACKGROUND OF THE INVENTION

A conventional method for detecting the malfunction of a vehicle fuel level sensor concludes that there is a fuel level sensor rationality malfunction if the fuel is within a certain range, the difference between maximum and minimum values of the fuel level sensor is below a certain value and if the vehicle has been travelling for a certain period of time. The conventional method also concludes that the fuel level sensor has malfunctioned and is stuck in a high or low state if the fuel is below the certain range, if the difference between maximum and minimum values of the fuel level sensor is below a certain value and if the vehicle has been travelling for a second certain period of time.

The conventional method uses fuel movement to test the fuel sensor. But, if the vehicle accelerates slowly and travels smoothly with a full fuel tank, the fuel level in the fuel tank may not show any change. Therefore, a conventional method may mistakenly conclude that a normally operating fuel level sensor is malfunctioning.

SUMMARY OF THE INVENTION

The present invention provides a fuel level sensor malfunction detecting method for a vehicle, in which change in the opening of the throttle valve is added as a malfunction judgment condition, or change in the opening of the throttle valve and a kick-down actuation are added as a malfunction judgment conditions, thereby making it possible to detect the fuel level sensor malfunctions more accurately.

In accordance with an embodiment of the present invention, a fuel level sensor malfunction detecting method for a vehicle includes: concluding certain monitoring conditions are satisfied; counting a time period during which a fuel level comes within a certain range and a difference between maximum and minimum values of the fuel level is less than a certain value; concluding a change rate of an opening of a throttle valve has shown a value greater than a certain value during the counted time period; accumulating malfunction occurrences if the change rate of the throttle valve opening was greater than the certain value; and concluding that the fuel level sensor has malfunctioned if the accumulated malfunction occurrences are greater than a certain malfunction value.

In another embodiment of the present invention a fuel level sensor malfunction detecting method for a vehicle includes: concluding certain monitoring conditions are satisfied; counting a time period during which a fuel level comes within a certain range and a difference between maximum and minimum values of the fuel level is less than a certain value; concluding a change rate of a throttle valve opening was greater than a certain value, and detecting a kick-down during the counted time period; accumulating malfunction occurrences if the change rate of the throttle valve opening was greater than the certain value, or if the kick-down was detected; and concluding that the fuel level sensor is malfunctioning if the accumulated malfunction occurrences are greater than a certain malfunction value.

In an additional embodiment of the present invention a method for detecting a failed fuel level sensor in a vehicle comprises: determining whether a fuel level sensor output is within a certain range; determining that a difference between a maximum and a minimum fuel level sensor output is below a certain value; monitoring the fuel level sensor and a throttle valve opening sensor for a time period wherein the vehicle is moving; accumulating a malfunction if, during the time period, the throttle valve opening sensor registered a rate of change greater than a certain rate; and concluding that the fuel level sensor is malfunctioning if the accumulated malfunctions exceed a certain malfunction value.

Furthermore, a system for detecting the malfunction of a fuel level sensor according to an embodiment of the invention includes a fuel level input, a throttle position input, a battery voltage input, a vehicle speed input, and an electronic control unit. In this embodiment the electronic control unit is programmed with instructions for concluding that the fuel level sensor is malfunctioning based on a throttle position. Another embodiment of the system of the invention includes a transmission signal input and the instructions further comprise concluding that the fuel level sensor is malfunctioning based on a transmission signal.

BRIEF DESCRIPTION OF THE DRAWINGS

For fuller understanding of the nature and objects of the invention, reference should be made to the following detailed description taken in conjunction with the accompanying drawings in which:

FIG. 3 is a flow chart of another preferred embodiment of the fuel level sensor malfunction detecting method for a vehicle according to the present invention.

Like numerals refer to similar elements throughout the several drawings.

DETAILED DESCRIPTION OF THE PREFERRED EMBODIMENTS

The present invention provides a fuel level sensor malfunction detecting system and method for a vehicle, in which change in the opening of the throttle valve is added as a malfunction judgment condition, or change in the opening of the throttle valve and a kick-down actuation are added as a malfunction judgment conditions, thereby making it possible to detect the fuel level sensor malfunctions more accurately.

Figure 1:
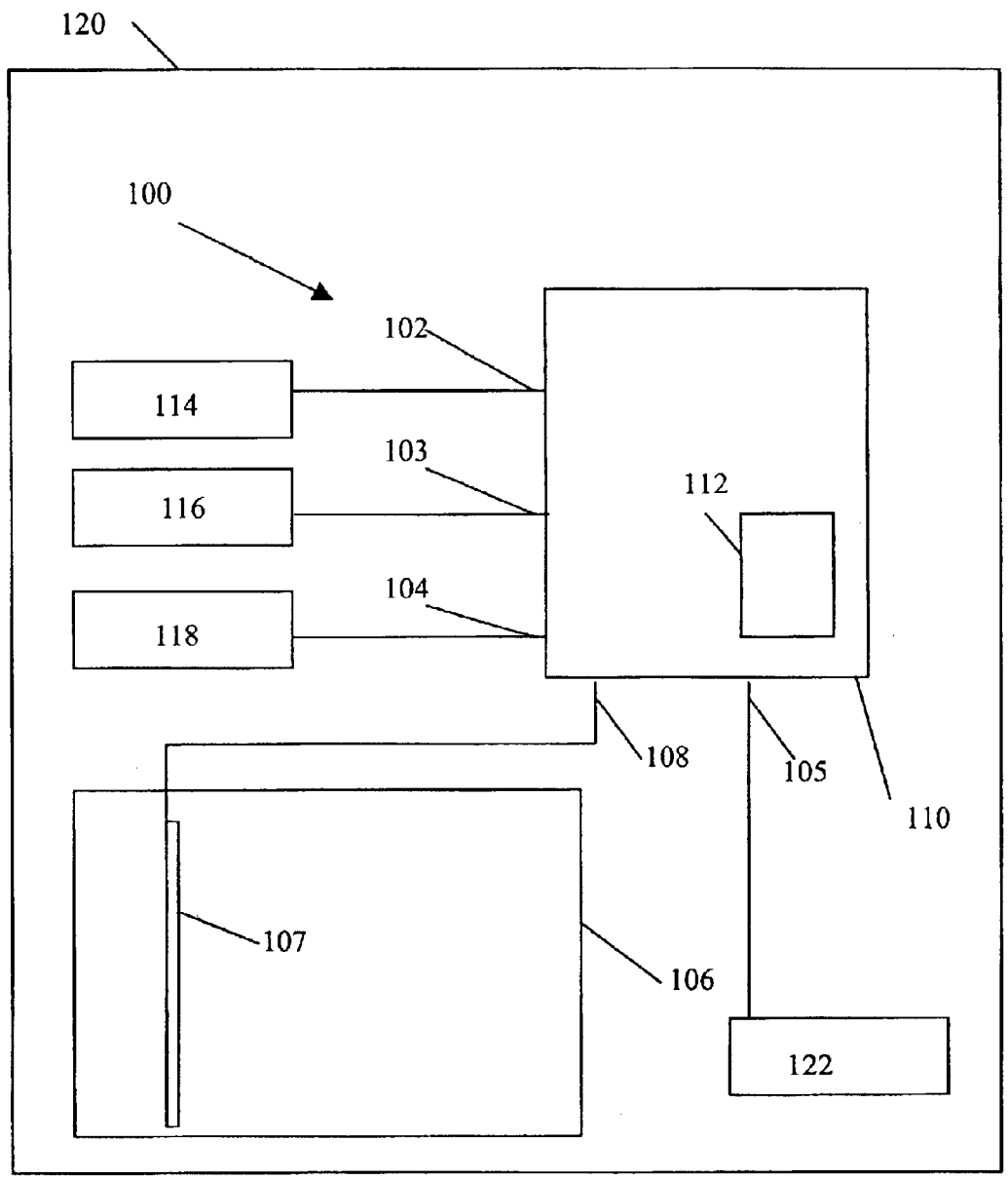
FIG. 1 is a block diagram of a system for detecting the malfunction of a fuel level sensor according to a preferred embodiment of the present invention.

In FIG. 1, a system 100 for detecting the malfunction of a fuel level sensor according to a preferred embodiment of the present invention includes a speed sensor signal input 102 for receiving a signal from a speed sensor 114 to electronic control unit (ECU) 112. System 100 includes a battery voltage signal input 103 from a battery 116 and a throttle sensor signal input 104 from a throttle position sensor 118 into ECU 112. In addition, system 100 includes a fuel level sensor signal input 108 into ECU 112 from a fuel level sensor 107 that measures the fuel level within fuel tank 106. The fuel level sensor 107 preferably senses the fuel level within sample intervals. System 100 includes a transmission signal input 105 with a transmission gear signal from a transmission 122. ECU 112 is equipped with a processor and a memory 112 and programmed as would be apparent to one of ordinary skill in the art to implement the instructions of the method according to the invention, which is described with reference to FIG. 2.

Figure 2:
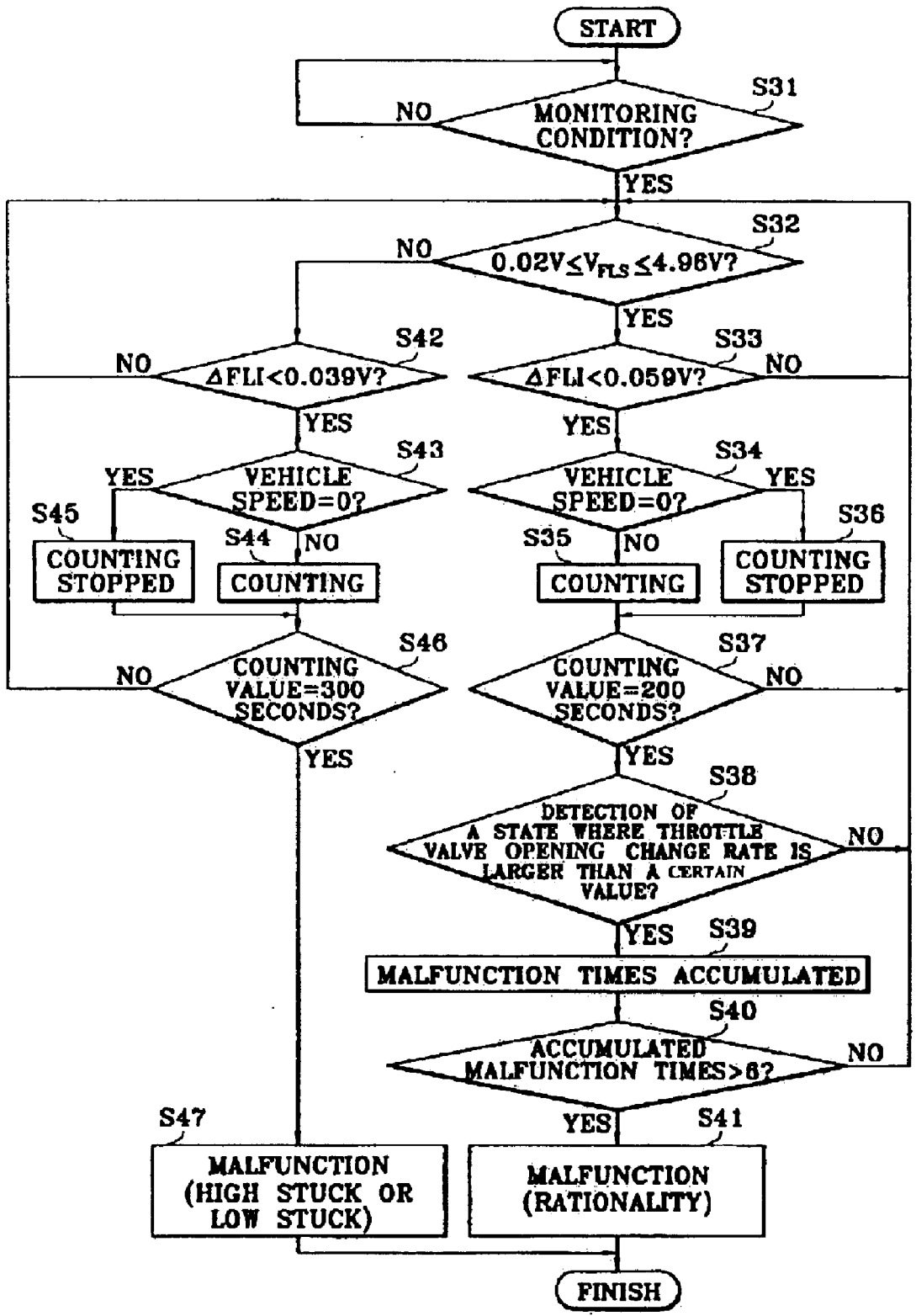
FIG. 2 is a flow chart of a fuel level sensor malfunction detecting method for a vehicle according to a preferred embodiment of the present invention.

As shown in FIG. 2, at step S31, a judgment is made as to whether the monitoring conditions are satisfied, and if satisfied, then the system proceeds to step S32. The monitoring conditions include whether the battery voltage is above a threshold level, preferably about 10V, and whether a minimum time period has elapsed after the release of the starting mode. In a preferred embodiment, the minimum time period after the release of the starting mode is about 10 seconds.

At step S32, a judgment is made as to whether the voltage value ($V_{FLS}$) from the fuel level sensor falls within a target range, preferably about $0.02V \leq V_{FLS} \leq 4.96V$. If it falls within the target range, then step S33 is carried out. If it departs from the target range, then step S42 is carried out. At step S33, a judgment is made as to whether the difference ($\Delta FLI$) between the maximum and minimum values of the output voltage value of the fuel level sensor ($V_{FLS}$) is smaller than a first minimum value, preferably about 0.059V. If the difference is smaller, then step S34 is carried out. The fuel level in a fuel tank is roughly proportional to the output voltage of the fuel level sensor. Thus, the method of the invention could substitute another type of signal for the voltage signal without departing from the invention.

At step S34, a judgment is made as to whether the car velocity is zero. If the car velocity is not zero, then step S35 is carried out. If the car velocity is zero, then step S36 is carried out. At step S35, a timer is activated to count the time, while at step S36, the counting operation is terminated. Then at step S37, a judgment is made as to whether the time period counted by the timer has reached 200 seconds. If so, step S38 is carried out. The counting value is preferably reset immediately after it has reached 200 seconds. At step S38, a judgment is made as to whether the change rate ($\Delta TPS(dt/dT)$) of the throttle valve opening has been more than a target rate, preferably about 0.04V/10 msec, at least once. If so, then step S39 is carried out. At step S39, the number of the malfunction occurrences is incremented to form an accumulated value. Then at step S40, a comparison is made as to whether the accumulated value is larger than a maximum malfunction value. Preferably, the malfunction number is incremented by one and the maximum malfunction value is set at six. If the malfunction number exceeds the maximum value, then step S41 is carried out. At step S41, it is concluded that the fuel level sensor has a rationality malfunction.

At step S32, if the $V_{FLS}$ was not between the target range, then at step S42, a judgment is made as to whether the difference ($\Delta FLI$) between the maximum and minimum values of the output voltage value ($V_{FLS}$) of the fuel level is smaller than a second minimum value, preferably about 0.039V. If smaller, then step S43 is carried out.

At step S43, a judgment is again made as to whether the car velocity is zero, and if the car velocity is not zero, then step S44 is carried out. If the car velocity is zero, then step S45 is carried out. At step S44, a timer is activated to count the time, while at step S45, the counting operation is terminated. Then at steps 46, a judgment is made as to whether the counted time of the counter has reached 300 seconds. If 300 seconds is reached, then it is determined that the fuel level sensor has malfunction and is stuck at a high state or a low state.

FIG. 3 is a flow chart showing another preferred embodiment of the fuel level sensor malfunction detecting method for a vehicle according to the present invention. This embodiment differs from the previous embodiment at step S38a. At step S38a, a judgment is made as to whether the change rate ($\Delta TPS(dt/dT)$) of the throttle valve opening is larger than the target rate (about 0.04V/10 msec) during the 200 seconds and whether a kick-down has been detected at least once or more during the 200 seconds. If both, then step S39 is carried out.

The kick-down condition is added because with an automatic transmission, if an abrupt acceleration is carried out, the automatic transmission will shift (kick-down) to a lower gear ratio to improve acceleration. With this kick-down, shock passes through the car body. Thus, the fuel within the fuel tank should show corresponding movement. Therefore, the number of the malfunction occurrences is accumulated when the change rate of the throttle valve opening is larger than the certain rate and if the kick-down has occurred.

According to a preferred embodiment of the present invention as described above, variations related to the opening of the throttle valve are added as malfunction conditions. Also, in a preferred embodiment variations related to the opening of the throttle valve or the kick-down status are added as malfunction judgment conditions, thereby making it possible to detect the malfunctions more accurately.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A fuel level sensor malfunction detecting method for a vehicle, comprising:

concluding that monitoring conditions are satisfied;

counting a time period during which (a) the fuel level comes within a target range and (b) a difference between maximum and minimum values of the fuel level is less than a first minimum value;

concluding a change rate of opening of a throttle valve has shown a value greater than a target value during the counted time period;

accumulating malfunction occurrences if the change rate of the throttle valve opening was greater than the target value; and concluding that the fuel level sensor has malfunctioned if the accumulated malfunction occurrences are greater than a maximum malfunction value.

2. The method of claim 1, wherein the monitoring conditions are satisfied if a battery voltage is above a threshold voltage and if a minimum time period has elapsed after release of a starting mode.

3. The method of claim 2, wherein the counted time period is 200 seconds.

4. The method of claim 1, further comprising:

counting a second time period during which (a) the fuel level is outside the target range and (b) the difference between the maximum and minimum values of the fuel level is less than a second minimum value; and concluding that the fuel level sensor has malfunctioned if the second time period has elapsed.

5. The method of claim 1, wherein said accumulating comprises accumulating the number of malfunction occurrences if both the change rate of the throttle valve opening was greater than the target value and a kick-down has been detected.

6. A fuel level sensor malfunction detecting method for a vehicle, comprising:

concluding that monitoring conditions are satisfied;

counting a time period during which (a) the fuel level comes within a target range and (b) a difference between maximum and minimum values of the fuel level is less than a minimum value;

concluding a change rate of a throttle valve opening was greater than a target value, or detecting a kick-down during the counted time period;

accumulating malfunction occurrences if the change rate of the throttle valve opening was greater than the target value and the kick-down was detected; and concluding that the fuel level sensor is malfunctioning if the accumulated malfunction occurrences are greater than a maximum malfunction value.

7. The method of claim 6, wherein the monitoring conditions are satisfied if a battery voltage is above a threshold voltage and if a maximum time period has elapsed after release of a starting mode.

8. The method of claim 6, wherein the counted time period is 200 seconds.

9. The method of claim 6, further comprising:

counting a second time period during which (a) the fuel level is outside the target range and (b) the difference between the maximum and minimum values of the fuel level is less than a second minimum value; and concluding that the fuel level sensor is malfunctioning if the second time period has elapsed.

10. A method for detecting a failed fuel level sensor in a vehicle, comprising:

determining whether a fuel level sensor output is within a target range;

determining that a difference between a maximum and a minimum fuel level sensor output is below a minimum value;

monitoring the fuel level sensor and a throttle valve opening sensor for a time period wherein the vehicle is moving;

accumulating a malfunction if, during the time period, the throttle valve opening sensor registered a rate of change greater than a target rate; and concluding that the fuel level sensor is malfunctioning if the accumulated malfunctions exceed a maximum malfunction value.

11. The method of claim 10 wherein said accumulating comprises accumulating a malfunction if, during the time period, both the throttle valve opening sensor registered a rate of change greater than a target rate, and a kick-down was detected.

12. A system for detecting the malfunction of a fuel level sensor, comprising:

a fuel level sensor generating a signal representative of fuel level;

a throttle position sensor generating a signal representative of throttle position;

a battery voltage sensor generating a signal representative of battery voltage;

a vehicle speed sensor generating a signal representative of vehicle speed; and an electronic control receiving said signals and unit programmed with instructions for determining if the fuel level sensor is malfunctioning based on said signals.

13. The system of claim 12, further comprising a transmission signal input and wherein said instructions further comprise determining if the fuel level sensor is malfunctioning based additionally on a transmission signal.

14. The system of claim 13, wherein said instructions comprise:

concluding that monitoring conditions are satisfied;

counting a time period during which (a) the fuel level comes within a target range and (b) a difference between maximum and minimum values of the fuel level is less than a first minimum value;

concluding a change rate of opening of a throttle valve has shown a value greater than a target value during the counted time period;

accumulating malfunction occurrences if the change rate of the throttle valve opening was greater than the target value; and concluding that the fuel level sensor has malfunctioned if the accumulated malfunction occurrences are greater than a maximum malfunction value.

* * * * *